(12) United States Patent
Hong et al.

(10) Patent No.: US 10,452,194 B2
(45) Date of Patent: Oct. 22, 2019

(54) DISPLAY DEVICE AND DRIVING METHOD FOR DISPLAY DEVICE USING THE SAME

(71) Applicant: Samsung Display Co., Ltd., Yongin-si (KR)

(72) Inventors: Won-Ki Hong, Suwon-si (KR); Jong Seo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/291,447

(22) Filed: Mar. 4, 2019

(65) Prior Publication Data

US 2019/0196649 A1 Jun. 27, 2019

Related U.S. Application Data

(63) Continuation of application No. 14/734,378, filed on Jun. 9, 2015, now Pat. No. 10,241,608.

(30) Foreign Application Priority Data

Dec. 3, 2014 (KR) .................. 10-2014-0172260

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/0416; G06F 3/044
See application file for complete search history.

(56) References Cited

U.S. PATENT DOCUMENTS 7,859,521 B2 12/2010 Hotelling et al.
8,730,208 B2 5/2014 Shin et al.
(Continued)

FOREIGN PATENT DOCUMENTS

JP 2014-052791 3/2014
KR 10-2010-0039194 4/2010
(Continued)

OTHER PUBLICATIONS

Non-Final Office Action dated Mar. 2, 2017, in U.S. Appl. No. 14/734,378.
(Continued)

*Primary Examiner* — Robert J Michaud
(74) *Attorney, Agent, or Firm* — H.C. Park & Associates, PLC

(57) ABSTRACT

A display device including a display, a plurality of gripping sensors formed at edges of the display and configured to generate a gripping signal according to a gripping of an edge of the display, a sensing scan driver configured to generate sensing input signals according to a gripping position based on the gripping signal, and a plurality of touch sensors formed on the display and configured to generate a sensing output signal in response to a touch of the display based on the sensing input signals, in which the sensing input signals include a first sensing input signal and a second sensing input signal, the first sensing input signal corresponds to a touched gripping sensor, the second sensing input signal corresponds to a non-touched gripping sensor, and the first sensing input signal has a higher voltage than the second sensing input signal.

17 Claims, 11 Drawing Sheets

(56) References Cited

U.S. PATENT DOCUMENTS

| | | | |
|---|---|---|---|
| 2010/0225443 A1 | 9/2010 | Bayram et al. | |
| 2011/0043475 A1* | 2/2011 | Rigazio | G06F 3/04883 345/173 |
| 2012/0044164 A1 | 2/2012 | Kim et al. | |
| 2012/0242597 A1 | 9/2012 | Hwang et al. | |
| 2013/0300681 A1 | 11/2013 | Jamshidi-Roudbari et al. | |
| 2014/0043277 A1* | 2/2014 | Saukko | G06F 3/044 345/174 |
| 2014/0184543 A1 | 7/2014 | Kim et al. | |
| 2015/0145819 A1* | 5/2015 | Bae | G06F 3/0416 345/174 |

FOREIGN PATENT DOCUMENTS

| | | |
|---|---|---|
| KR | 10-2012-0016729 | 2/2012 |
| KR | 10-2012-0118731 | 10/2012 |

OTHER PUBLICATIONS

Final Office Action dated Sep. 21, 2017, in U.S. Appl. No. 14/734,378.
Non-Final Office Action dated Dec. 27, 2017, in U.S. Appl. No. 14/734,378.
Final Office Action dated Jul. 12, 208, in U.S. Appl. No. 14/734,378.
Advisory Action dated Sep. 27, 2018, in U.S. Appl. No. 14/734,378.
Notice of Allowance dated Feb. 6, 2019, in U.S. Appl. No. 14/734,378.

* cited by examiner

DISPLAY DEVICE AND DRIVING METHOD FOR DISPLAY DEVICE USING THE SAME

CROSS-REFERENCE TO RELATED APPLICATIONS

This application is a continuation of U.S. patent application Ser. No. 14/734,378, filed on Jun. 9, 2015, and claims priority from and the benefit of Korean Patent Application No. 10-2014-0172260, filed on Dec. 3, 2014, each of which is incorporated by reference for all purposes as if fully set forth herein.

BACKGROUND

Field

Exemplary embodiments of the present invention relate to a display device and a driving method of the display device. More particularly, exemplary embodiments of the present invention relate to a technique for detecting a gripping position in a mobile device and driving a touch voltage.

Discussion of the Background

A touch screen may be formed by coupling a touch panel to a display device to display images and facilitate convenient input of user commands without using a keyboard or a mouse. The touch screen has been widely used for various electronic devices, such as mobile devices, navigation devices, TVs, ATMs, and point of sale (POS) devices. As mobile devices provide more services and functions, many recent mobile devices have graphic user mobile interfaces using a touch screen.

Since the touch screen may be formed by mounting a display device and a touch pad as a single unit, unlike a conventional mobile device, an additional space for mounting a keypad may not be required. As a result, a display device with a larger screen may be mounted on a mobile device. The touch screen may be classified into various types according to a driving method, such as a capacitive overlay type, an infrared beam type, a surface acoustic wave type, a piezoelectric type, an integral stain gauge type, and a resistive type. Among these types of touch screens, the resistive type touch screen has been widely used due to its high transmittance, high reaction rate, and strong tolerance, which may render the mobile device less affected by operational environments.

In conventional mobile devices with a large touch screen, the touch screen may be driven by using the same voltage, regardless of the size of the touch screen, which increases power consumption. In addition, when a display panel driving chip and a touch panel driving chip are driven simultaneously, noise may be mutually induced in the two driving chips to generate noise in the touch panel driving chip by the driving of the display panel, or in the display panel driving chip by the driving of the touch panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a device display including a large touch screen with ultra-high resolution that may reduce power loss.

Further, the exemplary embodiments of the present invention may improve touch accuracy and reduce touch error by minimizing noise effects caused by a parasitic capacitance.

Additional aspects of the inventive concept will be set forth in the detailed description which follows, and, in part, will be apparent from the disclosure, or may be learned by practice of the inventive concept.

According to an exemplary embodiment of the present invention, a display device includes a display unit including sensing input signal lines, sensing output signal lines, and touch sensors disposed on the sensing input signal lines and the sensing output signal lines, a sensor unit including gripping sensors corresponding to the sensing input signal lines, the sensor unit configured to generate a gripping signal including touch information of a first gripping sensor and position information of a first sensing input signal line corresponding to the first gripping sensor, a signal controller configured to control a sensing scan control signal such that a first sensing input signal including a higher voltage than a reference voltage is applied to the first sensing input signal line corresponding to the first gripping sensor according to the gripping signal, and a sensing scan driver configured to generate a sensing input signal that is applied to the sensing input signal lines according to the sensing scan control signal.

The signal controller may be configured to control the sensing scan control signal such that the first sensing input signal including a higher voltage than the reference voltage is applied to a second sensing input signal line disposed adjacent to the first sensing input signal line corresponding to the first gripping sensor, and a second sensing input signal including a lower voltage than the reference voltage is applied to sensing input signal lines other than the second sensing input signal line.

The display device may further include a second gripping sensor, in which the gripping signal may include first position information of the first sensing input signal line corresponding to the first gripping sensor and second position information of a second sensing input signal line corresponding to the second gripping sensor, and the signal controller may be configured to control the sensing scan control signal such that the first sensing input signal is applied to the first and second sensing input signal lines.

The display device may further include a third gripping sensor disposed between the first and second gripping sensors, the third gripping sensor corresponding to a third sensing input signal line, in which the signal controller may be configured to control the sensing scan control signal such that the first sensing input signal is applied to the first, second, and third sensing input signal lines, and touch information of the third gripping sensor may be different from touch information of the first and second gripping sensors.

The display device may further include a sensing signal processor configured to generate a sensing signal including touch information of a touch sensor based on a sensing output signal generated in response to a touch of the touch sensor, in which the signal controller may be configured to generate first statistics based on the gripping signal and an accumulated sensing signal of a first user, and second statistics based on the gripping signal and an accumulated sensing signal of a second user.

The display device may further include of a fourth touch sensor corresponding to a fourth gripping sensor that is not disposed adjacent to the first or the second gripping sensors, in which the sensing signal may include the touch information of each of the first, second, third, and fourth touch sensors respectively corresponding to the first, second, third, and fourth gripping sensors, the first and second statistics may include a first number of touch times accumulated for the first touch sensor, a second number of touch times accumulated for the second touch sensor, a third number of touch times accumulated for the third touch sensor, and a fourth number of touch times accumulated for the fourth touch sensor, and the signal controller may be configured to control the sensing scan control signal such that the first sensing input signal is applied to the sensing input signal line that has a number of touch times accumulated for the corresponding touch sensor equal to or greater than a reference touch number, among the first to fourth numbers of touch times.

The signal controller may be configured to control the sensing scan control signal such that the second sensing input signal is applied to the sensing input signal line that has a number of touch times accumulated for the first touch sensor corresponding touch sensor smaller than the reference touch number, among the first to fourth numbers of touch times.

The signal controller may be configured to control the sensing scanning signal such that a third sensing input signal that has the same voltage as the reference voltage is applied to all of the sensing input signal lines when the touch information of the gripping signal does not indicate that the gripping sensors are touched.

The controller may be configured to control the sensing scan control signal such that the sensing scan control signal is adjusted according to Gaussian distribution that has the first sensing input signal as a maximum value.

The controller may be configured to control the sensing scan control signal such that the sensing scan control signal is adjusted according to inverse Gaussian distribution that has the first sensing input signal as a minimum value.

According to an exemplary embodiment of the present invention, a driving method of a display device includes sensing a grip by a sensor unit in response to touching of a first gripping sensor, detecting a position of a first sensing input signal line corresponding to the first touched gripping sensor, generating a gripping signal including touch information of the first touched gripping sensor and position information of the sensing input signal line corresponding to the first touched gripping sensor, controlling the sensing scan control signal such that a first sensing input signal including a higher voltage than a reference voltage is applied to the first sensing input signal line corresponding to the first touched gripping sensor according to the gripping signal, and generating a sensing input signal applied to the first sensing input signal line according to the sensing scan control signal, in which the display device includes a display unit including sensing input signal lines, sensing output signal lines, and touch sensors disposed on the sensing input signal lines and the sensing output signal lines, a sensing scan driver, the sensor unit including gripping sensors corresponding to the sensing input signal lines, and a signal controller configured to generate the sensing scan control signal.

The controlling of the sensing scan control signal may include controlling the sensing scan control signal such that the first sensing input signal including a higher voltage than the reference voltage is applied to a second sensing input signal line disposed adjacent to the first sensing input signal line that corresponds to the first touched gripping sensor, and controlling the sensing scan control signal such that a second sensing input signal including a lower voltage than the reference voltage is applied to sensing input signal lines other than the second sensing input signal line.

The touched gripping sensor may include a second touched gripping sensor, and the detecting of the position of the sensing input signal line may include detecting a position of a first sensing input signal line corresponding to the first touched gripping sensor and a position of a second sensing input signal line corresponding to the second touched gripping sensor, the generating of the gripping signal includes generating the gripping signal including position information of the first and second sensing input signal lines, and the controlling of the sensing scan control signal includes controlling the sensing scan control signal such that the first sensing input signal is applied to the first and second sensing input signal lines.

The display device may further include a third untouched gripping sensor disposed between the first and second gripping sensors, the third untouched gripping sensor corresponding to a third sensing input signal line, and the signal controller may control the sensing scan control signal such that the first sensing input signal is applied to the first, second, and third sensing input signal lines.

The display device may further include a sensing signal processor configured to generate a sensing signal including touch information of a touch sensor based on a sensing output signal generated in response to a touch of the touch sensor, and the generating of the gripping signal may include generating first statistics based on the gripping signal and an accumulated sensing signal of a first user, and generating second statistics based on the gripping signal and an accumulated sensing signal of a second user.

The display device may further include a fourth touch sensor corresponding to a fourth gripping sensor that is not disposed adjacent to the first or second gripping sensors, the sensing signal may include touch information of each of the first, second, third, and fourth touch sensors respectively corresponding to the first, second, third, and fourth gripping sensors, the first statistics and the second statistics may each include a first number of touch times accumulated for the first touch sensor, a second number of touch times accumulated for the second touch sensor, a third number of touch times accumulated for the third touch sensor, and a fourth number touch of times accumulated for the fourth touch sensor, and the controller may control the sensing scan control signal such that the first sensing input signal is applied to the sensing input signal line that has a number of touch times accumulated for the corresponding touch sensor equal to or greater than a reference touch number, among the first to the fourth numbers of touch times.

The controlling of the sensing scan control signal may include controlling the sensing scan control signal such that the second sensing input signal is applied to the sensing input signal line that has a number of touch times accumulated for the corresponding touch sensor smaller than the reference touch number, among the first to fourth touch numbers of touch times.

The controlling of the sensing scan control signal may include controlling the sensing scanning signal such that a third sensing input signal that has the same voltage as the reference voltage is applied to all of the sensing input signal lines when the touch information of the gripping signal does not indicate that the gripping sensors are touched.

The controlling of the sensing scan control signal may include controlling the sensing scan control signal such that the sensing scan control signal is adjusted according to Gaussian distribution that has the first sensing input signal as a maximum value.

The controlling of the sensing scan control signal may include controlling the sensing scan control signal such that the sensing scan control signal is adjusted according to inverse Gaussian distribution that has the first sensing input signal as a minimum value.

According to an exemplary embodiment of the present invention, a display device includes a display, a plurality of gripping sensors formed at edges of the display and configured to generate a gripping signal according to a gripping of an edge of the display, a sensing scan driver configured to generate sensing input signals according to a gripping position based on the gripping signal, and a plurality of touch sensors formed on the display and configured to generate a sensing output signal in response to a touch of the display based on the sensing input signals, in which the sensing input signals include a first sensing input signal and a second sensing input signal, the first sensing input signal corresponds to a touched gripping sensor, the second sensing input signal corresponds to a non-touched gripping sensor, and the first sensing input signal has a higher voltage than the second sensing input signal.

According to an exemplary embodiment of the present invention, a sensor device included in a display includes a first sensor group formed at edges of the display and configured to generate first signals according to a touch of the first sensor group, and a second sensor group formed on the display and configured to generate output signals in response to a touch of the second sensor group based on input signals, in which voltage input signals are proportional to whether the first sensor group is touched, the input signals include a first input signal and a second input signal, the first input signal corresponds to a touched sensor, the second input signal corresponds to a non-touched sensor, and the first input signal has a higher voltage than the second input signal.

According to the exemplary embodiments of the present invention, it may be possible to provide a device display such as a mobile device including a large touch screen with ultrahigh resolution that may reduce power loss.

Further, it may be possible to improve touch accuracy and reduce touch error by minimizing noise effects caused by a parasitic capacitance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
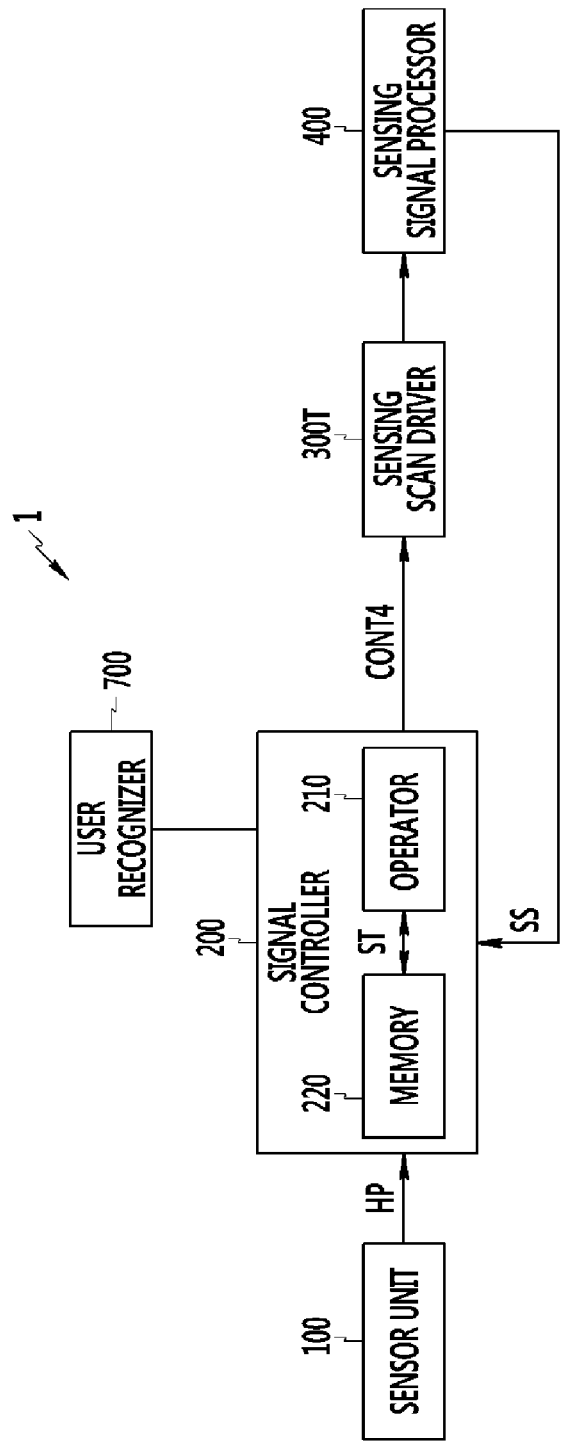
FIG. 1 illustrates a configuration of a mobile device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a display device according to an exemplary embodiment of the present invention will be described with reference to FIG. 1 to FIG. 5.

FIG. 1 illustrates a configuration of a mobile device according to an exemplary embodiment of the present invention.

FIG. 2, FIG. 3, FIG. 4, and FIG. 5 illustrate the display device according to the present exemplary embodiment.

Figure 2:
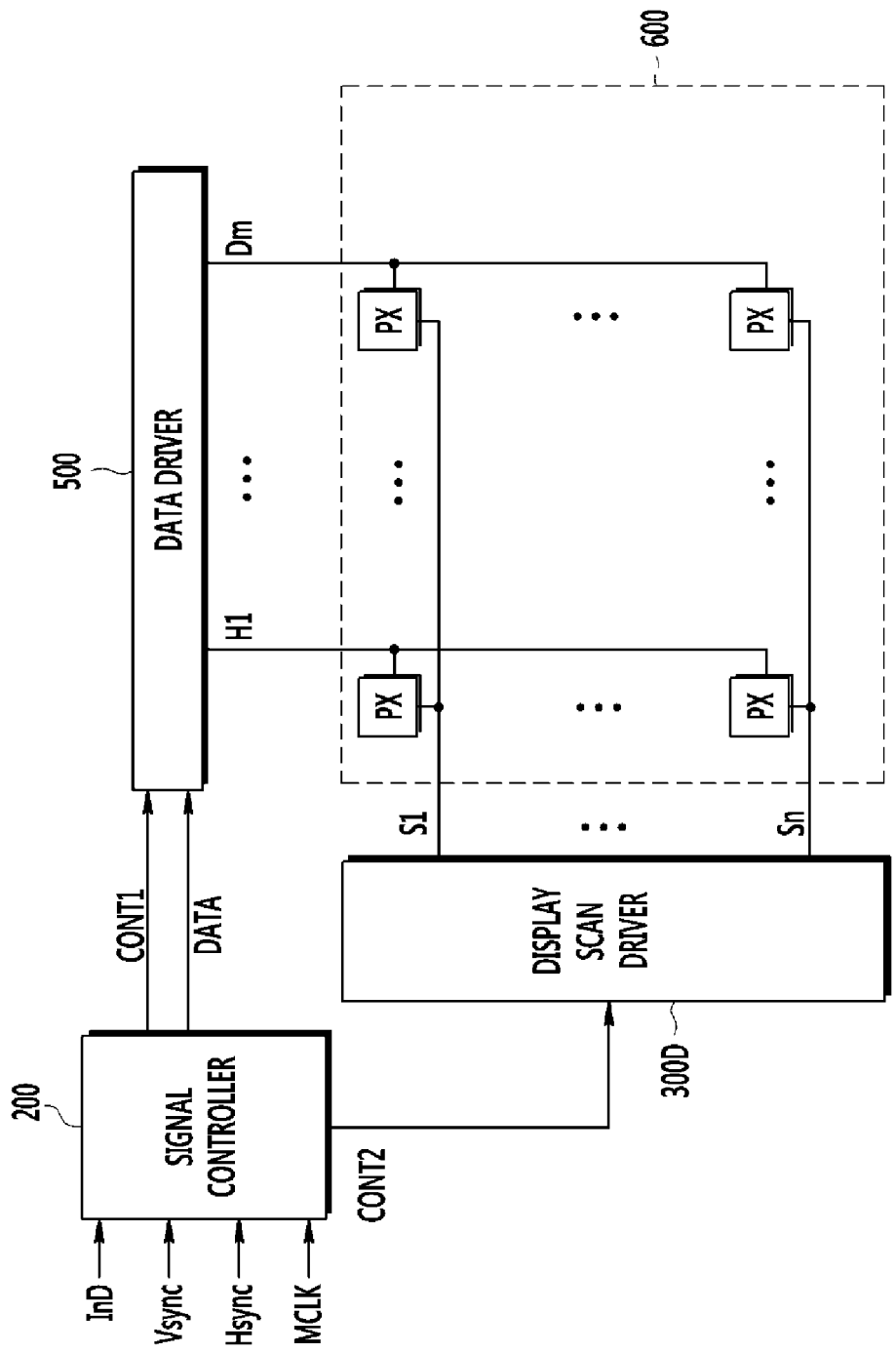
FIG. 2 and FIG. 3 illustrate a display unit according to an exemplary embodiment of the present invention.
Figure 3:
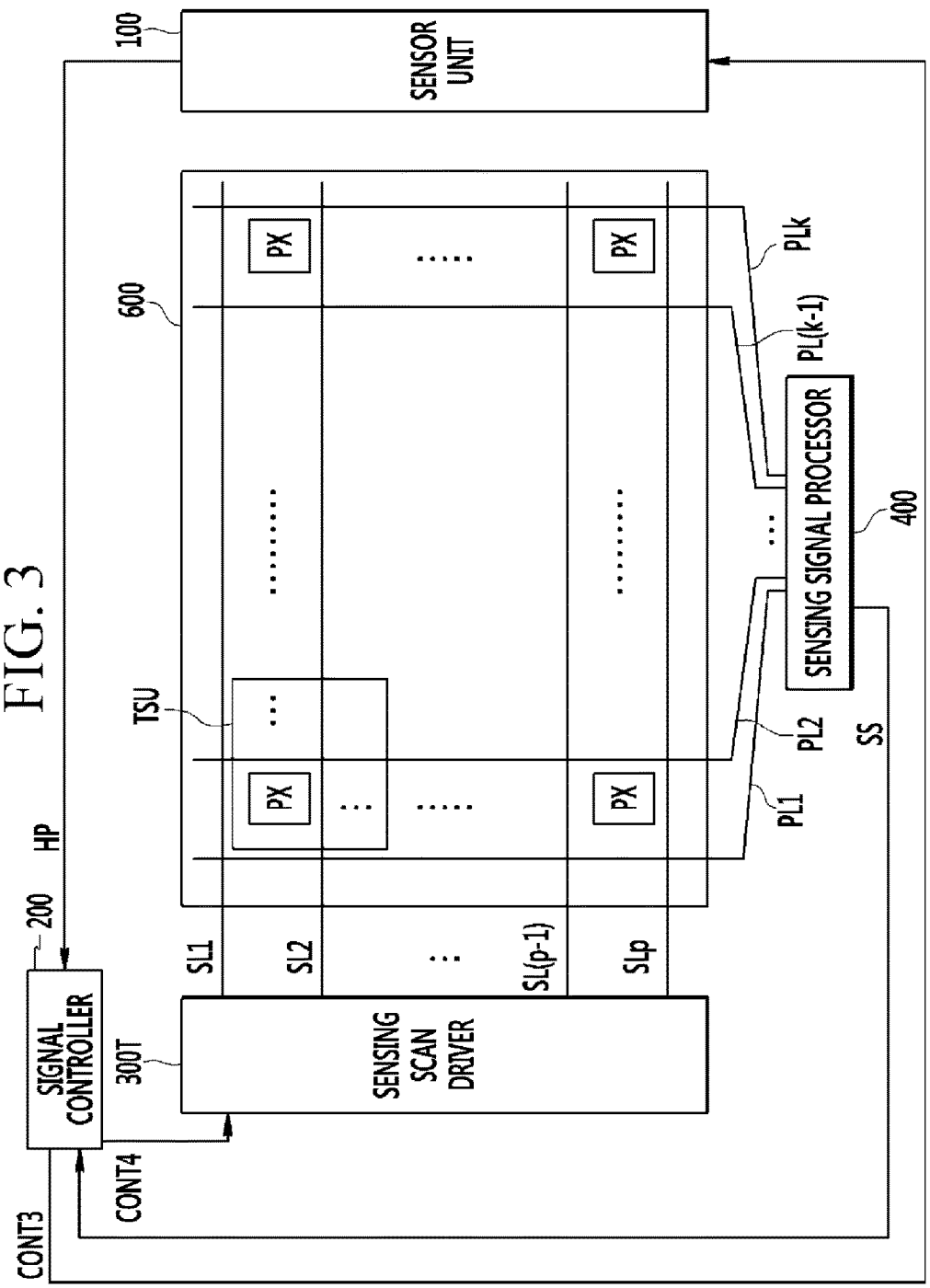

Referring to FIG. 1, FIG. 2, and FIG. 3, the display device according to the present exemplary embodiment includes scanning lines S1-Sn, data lines D1-Dm, sensing input signal lines SL1-SLp, sensing output signal lines PL1-PLk, a sensor unit 100, a signal controller 200, a display scan driver 300D, a sensing scan driver 300T, a sensing signal processor 400, a data driver 500, a display unit 600, and a user recognizer 700.

The display device 1 may improve touch sensitivity by adjusting the size of a sensing input signal of a touch sensor TSU that has a high possibility of touch according to a gripping position sensed by the sensor unit 100. Further, the display device 1 may improve the touch sensitivity by adjusting the size of a sensing input signal of the touch sensor TSU that has a high number of touch times per user recognized by the user recognizer 700.

As shown in FIG. 2, the scanning lines S1-Sn (n is a natural number) are arranged in a vertical direction and extend in a horizontal direction. The data lines D1-Dm (m is a natural number) are arranged in the horizontal direction and extend in the vertical direction.

The display unit 600 is connected to the scanning lines S1-Sn and the data lines D1-Dm, and includes pixels PX that are arranged substantially in a matrix form.

The display scan driver 300D is connected to the scanning lines S1-Sn to sequentially apply scanning signals S[1]-S[n] thereto according to a scan control signal CONT2.

The data driver 500 is connected to the data lines D1-Dm. The data driver 500 generates data signals (e.g., data voltages) to correspond to inputted image data DATA.

The user recognizer 700 is configured to identify users of the display device 1. The user recognizer 700 recognizes users by using user recognizing information such as ID, password, fingerprint, and the like.

The signal controller 200 receives external input data InD and a synchronization signal to generate a data driving control signal CONT1, a display scan control signal CONT2, a sensor control signal CONT3, a sensing scan control signal CONT4, and image data DATA. The signal controller 200 controls a sensing input signal according to a gripping position based on a gripping signal HP. Further, the signal controller 200 controls the sensing input signal according to the gripping signal HP and touch habit statistics.

The external input data InD contains luminance information of each pixel PX, and the luminance has a predetermined number of gray levels, for example, $1024(=2^{10})$, $256(=2^8)$, or $64(=2^6)$ grays. The synchronization signal includes a horizontal synchronizing signal Hsync, a vertical synchronization signal Vsync, and a main clock signal MCLK. The signal controller 200 divides the external input data InD by a frame unit according to a vertical synchronization signal Vsync. Then, the signal controller 200 generates image data DATA by dividing the external input data InD by a scan line unit according to the horizontal synchronizing signal Hsync.

The signal controller 200 may include an operator 210 and a memory 220.

When the gripping signal HP indicates that no touch is performed at the gripping sensor, the operator 210 may generate the sensing scan control signal CONT4 such that a predetermined reference voltage is applied to all sensing input signal lines SL1-SLp. The operator 210 recognizes a position of the sensing input signal line corresponding to the gripping signal HP indicating that a touch is performed at the gripping sensor. The operator 210 may generate the sensing scan control signal CONT4 such that the sensing input signal (e.g., sensing input voltage) corresponding to the touched gripping sensor is amplified or reduced than the predetermined reference voltage. The operator 210 may determine the touch sensor TSU that has a high possibility of being touched, based on the gripping signal HP. Further, the operator 210 may generate first user statistics ST based on accumulated sensing signals SS that correspond to the gripping signal HP of a first user recognized by the user recognizer 700, and generate second user statistics ST based on accumulated sensing signals SS that correspond to the gripping signal HP of a second user recognized by the user recognizer 700. The operator 210 determines that a touch possibility is high, based on the statistics ST, when a number of touch times of touch sensors TSU other than the touch sensor TSU that corresponds to the touched gripping sensor per user is equal to or greater than a predetermined reference level. The operator 210 may generate the sensing scan control signal CONT4 such that a sensing signal applied to the touch sensor TSU with a high touch possibility per user is amplified or reduced.

Hereinafter, an operation in which the operator 210 controls the sensing input voltage may indicate that the operator 210 generates the sensing scan control signal CONT4 such that the sensing input signal is amplified or reduced to correspond to the gripping position.

The memory 220 may store the sensing signals SS and the statistics ST per user.

A pixel PX is a unit displaying an image, and may display one of primary colors (spatial division) or a plurality of pixels PX may alternately display the primary colors in a given time (temporal division), such that a desired color may be displayed by a spatial or temporal sum of the primary colors.

The pixel PX may be synchronized with a corresponding scanning signal to receive a data signal from a corresponding data line. The data signal inputted into the pixel PX is provided to the pixel PX according to the scanning signal that is supplied through the scanning line.

As shown in FIG. 3, sensing input signal lines SL1-SLp (p is a natural number) are arranged in the vertical direction and extend in the horizontal direction. A sensing output signal lines PL1-PLk (k is a natural number) are arranged in the horizontal direction and extend in the vertical direction. The touch sensors TSU are connected to the corresponding sensing input signal lines SL1-SLp and the corresponding sensing output signal lines PL1-PLk. The pixels PX are arranged in a matrix form.

The display unit 600 is connected to the sensing input signal lines SL1-SLp and sensing output signal lines PL1-PLk, and includes the touch sensors TSU and the pixels PX that are arranged substantially in a matrix form.

The sensing input signal lines SL1-SLp are connected to the sensing scan driver 300T and extend substantially parallel to each other. The sensing input signal lines SL1-SLp may transfer the sensing input signals inputted from the sensing scan driver 300T. The sensing input signals may have various waveforms and voltage levels.

The sensing output signal lines PL1-PLk are connected to the sensing signal processor 400 and extend substantially parallel to each other to cross the sensing input signal lines SL1-SLp. The sensing output signals generated by the touch sensor TSU according to touches of the display unit 600 may be applied to the sensing output signal lines PL1-PLk.

The sensing scan driver 300T applies the sensing input signals (e.g., sensing input voltages) according to gripping positions to the sensing input signal lines SL1-SLp according to the sensing scan control signal CONT4. In this case, the sensing input signals may be sequentially applied.

The sensing signal processor 400 may generate the sensing signals SS that include touch information, such as touch existence and touch positions based on the sensing output signals. As shown in FIG. 3, the sensing signal processor 400 may be separated from the signal controller 200. Alternatively, the sensing signal processor 400 may be included in the signal controller 200.

The touch sensor TSU may generate the sensing output signals according to touches, by using a capacitive method. As shown in FIG. 3, one touch sensor TSU may be disposed at a position where one sensing input signal line SL1 and one sensing output signal line PL2 cross each other. The length of one side of the touch sensor TSU may be about several millimeters, e.g., about 4 to 5 mm. The size of the touch sensor TSU may be varied according to a touched area when an object touches the display unit 600.

Further, the pixels PX may be disposed at a region of one touch sensor TSU. For example, several tens to hundreds of arrays of the pixels PX may be disposed in a row or column direction of the touch sensor TSU.

The density of the pixels PX in one touch sensor TSU may vary according to the resolution of the display device.

Figure 4:
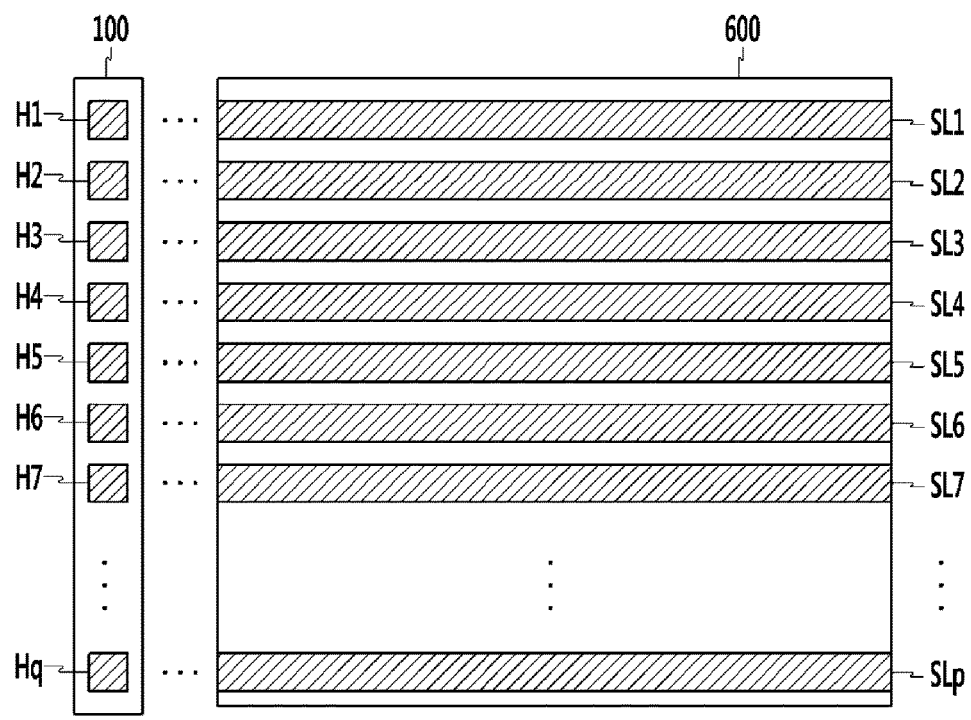
FIG. 4 and FIG. 5 illustrate a sensor unit according to an exemplary embodiment of the present invention.

As shown in FIG. 4, the sensor unit 100 may include gripping sensors H1-Hq (q is a natural number) having an internal resistance that may vary according to touches. The sensor unit 100 may sense a gripping position by using a variation of the internal resistance of the touched gripping sensor. The sensor unit 100 may generate position information of the sensing input signal line corresponding to the touched gripping sensor and the gripping signal HP that includes a changed value of the internal resistance of the touched gripping sensor. For convenience of description, in FIG. 4, it is illustrated that each gripping sensor H1-Hq correspond to each sensing input signal lines SL1-SLp. Alternatively, one gripping sensor may correspond to a sensing input signal line group including two or more sensing input signal lines.

Referring to FIG. 4, the sensor unit 100 is formed at a left side of the display unit 600. Alternatively the sensor unit 100 may be formed at a right side of the display unit 600, or at the left side and the right side of the display unit 600.

Figure 5:
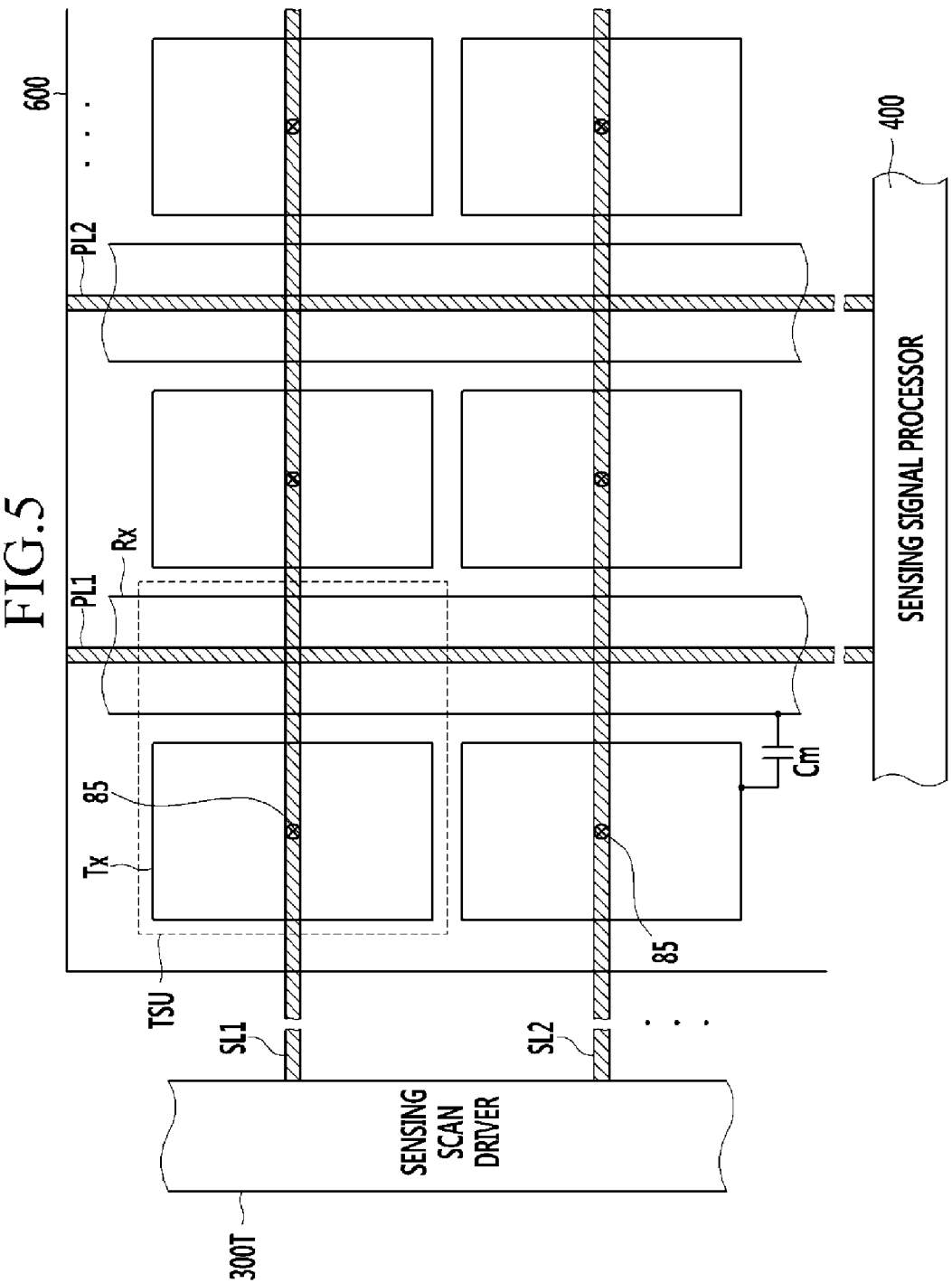

As shown in FIG. 5, the touch sensor TSU includes a sensing capacitor Cm that is formed of the sensing input signal line SL2 and the sensing output signal line PL1. The sensing capacitor Cm may include an overlap sensing capacitor that is formed by overlapping the sensing input signal line SL2 and the sensing output signal line PL1, or a fringe sensing capacitor that is formed to include the sensing input signal line SL2 and the sensing output signal line PL1 that are adjacent to each other without overlapping each other. The touch sensor TSU may receive the sensing input signal that is transferred by the sensing input signal line SL2 to generate the sensing output signal that indicates the change of a charge amount of the sensing capacitor Cm caused by the touch of an external object. Specifically, when the sensing input signal is inputted into the touch sensor TSU, the sensing capacitor Cm is charged with a predetermined charge amount, and a change in the charge amount that corresponds to the touch is outputted as the sensing output signal to the sensing output signal line PL2. In other words, upon the touch of an external object, the charge amount may change in the sensing capacitor Cm, and the corresponding sensing output signal is outputted to the sensing output signal line PL2. A voltage level of the sensing output signal generated when the external object touches the display unit 600 may be smaller than a voltage level of the sensing output signal generated when the external object does not touch the display unit 600.

The sensing input electrodes Tx may be arranged in a matrix form. The sensing input electrodes Tx that are arranged in a column direction constitute one sensing input electrode column, and the sensing input electrodes Tx that are arranged in a row direction constitute one sensing input electrode row. The sensing input electrodes Tx disposed at one sensing input electrode column may be connected to each other. Each of the sensing input electrodes Tx may have a quadrangular shape as shown in FIG. 5, but may have various shapes. The length of one side of the sensing input electrodes Tx may be about several millimeters, but the length may vary according to touch objects and touch methods.

Sensing output electrodes Rx may extend longitudinally in the column direction, and arranged at a predetermined interval. Each of the sensing output electrodes Rx is disposed between two adjacent sensing input electrode columns, and the sensing output electrodes Rx and the sensing input electrodes Tx may be alternatively arranged in the row direction.

The sensing output electrode Rx and the sensing input electrode Tx that are adjacent to each other may be disposed at a predetermined interval to face each other. The sensing output electrode Rx and the sensing input electrode Tx that are adjacent to each other constitute one touch sensor TSU. When an external touch is applied, the charge amount of the sensing capacitor Cm of the touch sensor TSU may change, and this change of the charge amount may be reflected on the sensing output signal so as to generate the output sensing signal. The sensing output electrodes Rx and the sensing input electrodes Tx may be disposed on the same plane in a single plane structure, but may be disposed at different layers. When the sensing output electrodes Rx and the sensing input electrodes Tx are disposed at different layers, at least a portion of the sensing output electrodes Rx and the sensing input electrodes Tx may overlap each other. The sensing output electrodes Rx and the sensing input electrodes Tx may be formed of a transparent conductive material, such as indium tin oxide (ITO), indium zinc oxide (IZO), or the like.

The sensing input electrodes Tx disposed at a row are electrically connected to the sensing input signal lines SL1-SLp respectively, and the sensing output electrodes Rx are electrically connected to the sensing output signal lines PL1-PLk respectively.

The sensing input signal lines SL1-SLp and the sensing output signal lines PL1-PLk may include a conductive material, e.g., a metal such as copper (Cu), of which the resistance is lower than those of the sensing input electrode Tx and the sensing output electrode Rx. The sensing input signal lines SL1-SLp and the sensing output signal lines PL1-PLk may have a multilayer structure including two or more conductive materials. The sensing input signal lines SL1-SLp and the sensing output signal lines PL1-PLk may be disposed at different layers. Hereinafter, the sensing input signal lines SL1-SLp are assumed to be disposed above the sensing output signal lines PL1-PLk.

The sensing output signal lines PL1-PLk may be disposed above the output electrode Rx. The sensing output signal lines PL1-PLk may extend longitudinally in the column direction, and each of the sensing output signal lines PL1-PLk is directly connected to corresponding sensing output electrodes Rx. An insulating layer (not shown) is disposed above the sensing output signal lines PL1-PLk. The insulating layer may include an organic insulating material or an inorganic insulating material. The insulating layer may have touch holes 85 for exposing the sensing input electrodes Tx.

The sensing input signal lines SL1-SLp may be disposed above the insulating layer. The sensing input signal lines SL1-SLp may extend longitudinally in the row direction, and may be electrically connected to the sensing input electrodes Tx arranged in the row direction through the touch holes 85. Accordingly, the sensing input electrodes Tx arranged at one row are connected to each other through one of corresponding sensing input signal lines SL1-SLp. One sensing input electrode Tx and a part of the sensing output electrode Rx that is adjacent thereto may constitute one touch sensor TSU.

Hereinafter, a driving method of a display device according to an exemplary embodiment of the present invention will be described with reference to FIG. 6 to FIG. 9.

Figure 6:
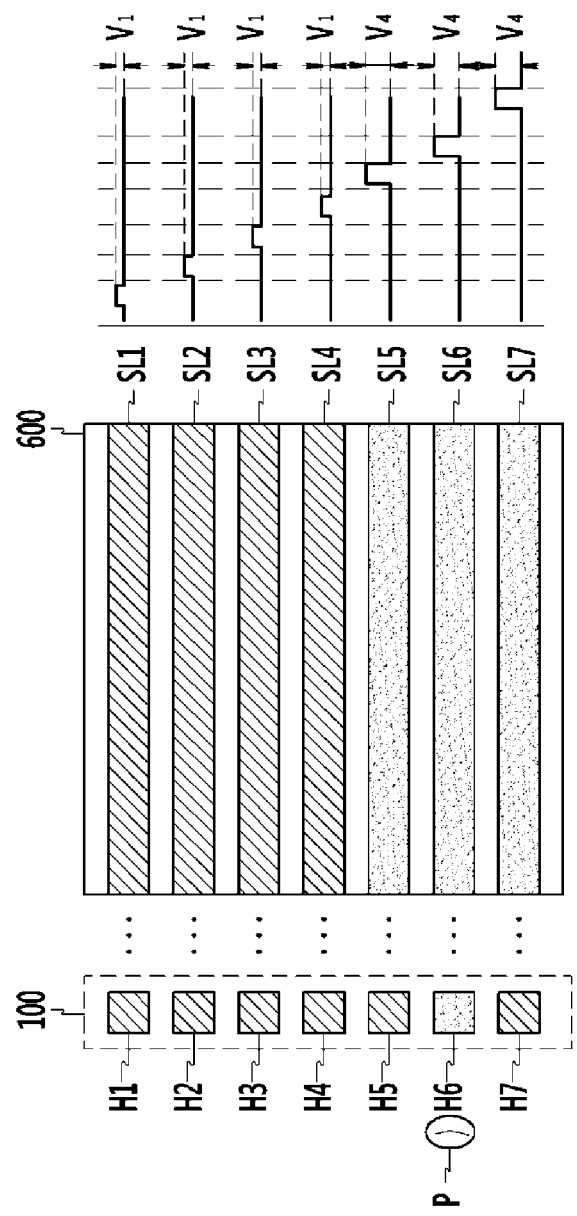
FIG. 6 and FIG. 7 illustrate a sensing input signal according to a single touch.
Figure 7:
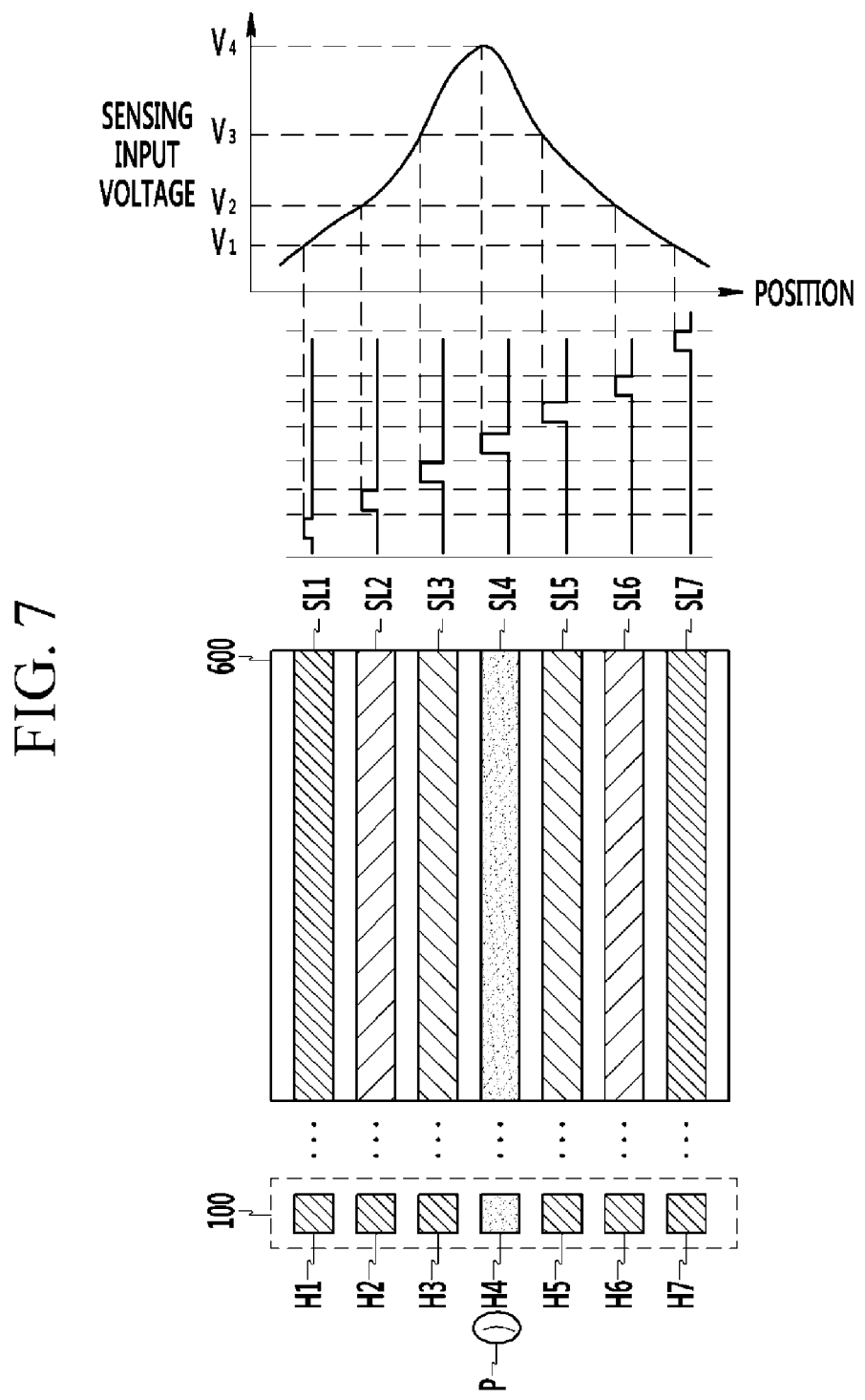

FIG. 6 and FIG. 7 illustrate a sensing input signal according to a single touch.

As shown in FIG. 6, the gripping sensors H1-H7 respectively correspond to the sensing input signal lines SL1-SL7.

The operator 210 controls a sensing input voltage of the sensing input signal line by amplifying the sensing input voltage higher than a predetermined reference voltage for the sensing input signal line that is determined to have a high possibility of touch, and by reducing the sensing input voltage lower than the predetermined reference voltage for the sensing input signal line that is determined to have a low possibility of touch. For example, a position of the sensing input signal line SL6 is detected based on the gripping signal HP that is generated when the gripping sensor H6 is touched by a finger P. The operator 210 then determines that the touch sensors TSU connected to the sensing input signal lines SL5 and SL7 arranged vertically adjacent to the sensing input signal line SL6 have a high possibility of touch. The operator 210 controls the sensing input voltages of the sensing input signal lines SL5 and SL7 to be amplified as a voltage $V_4$. The operator 210 determines the touch sensors TSU connected to the sensing input signal lines SL1-SL5 to have a small possibility of touch. The operator 210 controls the sensing input voltages of the sensing input signal lines SL1-SL5 to be reduced as a voltage $V_1$.

As shown in FIG. 7, as the gripping sensor H4 is touched by the finger P, the operator 210 determines the touch sensor TSU connected to the sensing input signal line SL4 to have a high possibility of touch and controls the sensing input voltage of the input signal line SL4 to be amplified to the maximum voltage $V_4$. The operator 210 determines that, according to Gaussian distribution, a possibility of being touched reduces as a distance from the gripping sensor H4 increases, and adjusts the sensing input voltage according to the Gaussian distribution. Specifically, a position of the sensing output signal line SL4 corresponding to the gripping sensor H4 is detected based on the gripping signal HP generated as the gripping sensor H4 is touched by the finger P. The operator 210 controls the sensing input voltage of the sensing input signal line SL4 to voltage $V_4$. The operator 210 controls the sensing input voltages of the sensing input signal lines SL3 and SL5 corresponding to the gripping sensor H3 and H5 that are vertically adjacent to the gripping sensor H4 to be a voltage $V_3$. The operator 210 controls the sensing input voltages of the sensing output signal line SL2 corresponding to the gripping sensor H2 that is adjacent to the gripping sensor H3 and the sensing output signal line SL6 corresponding to the gripping sensor H6 that is adjacent to the gripping sensor H5 to voltage $V_2$. The operator 210 controls the sensing input voltages of the sensing output signal line SL1 corresponding to the gripping sensor H1 and the sensing output signal line SL7 corresponding to the gripping sensor H7 to voltage $V_1$.

According to an exemplary embodiment of the present invention, the operator 210 may determine that, according to inverse Gaussian distribution, a possibility of being touched increases as the distance from the gripping sensor H4 increases, and adjusts the sensing input voltage according to inverse Gaussian distribution. For example, as the gripping sensor H4 is touched by the finger P, the operator 210 may determine that a possibility of the touch sensor TSU connected to the sensing input signal line SL4 being touched is the lowest and control the sensing input voltage of the input signal line SL4 to be the minimum voltage $V_1$.

Figure 8:
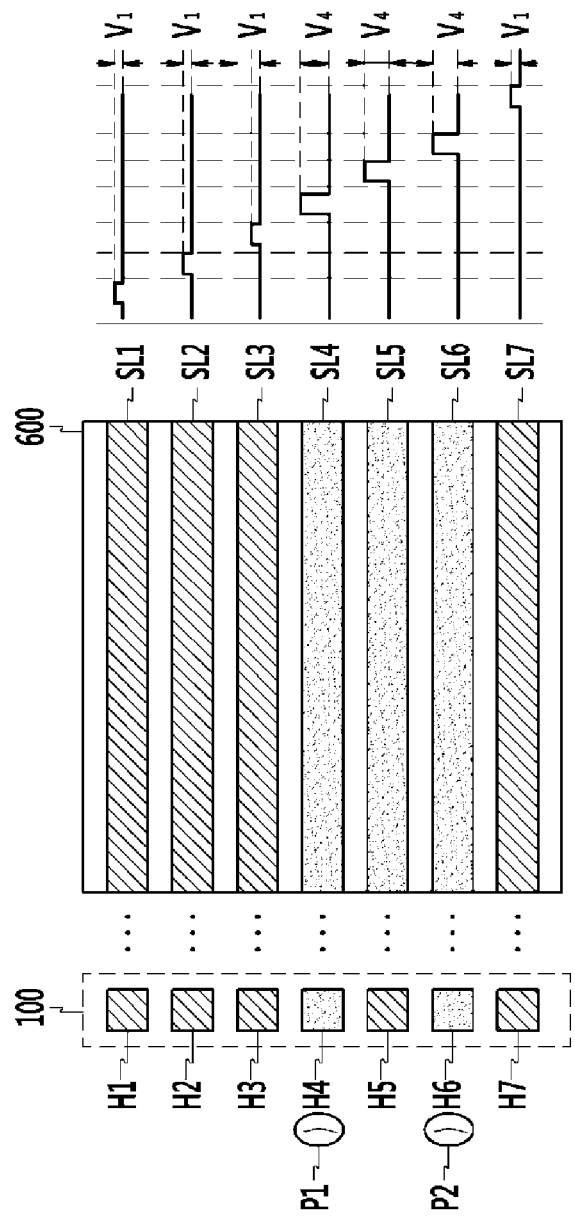
FIG. 8 illustrates a sensing input signal according to a multi-touch.

FIG. 8 illustrates a sensing input signal according to a multi-touch.

As shown in FIG. 8, the operator 210 controls the sensing input voltage of the sensing input signal line by amplifying the sensing input voltage higher than a predetermined reference voltage for the sensing input signal line that is determined to have a high possibility of touch based on the gripping signal HP generated by multi-touch, and by reducing the sensing input voltage lower than the predetermined reference voltage for the sensing input signal line that is determined to have a low possibility of touch. For example, positions of the sensing input signal lines SL4 and SL6 corresponding to the gripping sensors H4 and H6 are detected based on the gripping signals HP generated as the gripping sensors H4 and H6 are touched by fingers P1 and P2. The operator 210 determines the touch sensors TSU connected to the sensing input signal lines SL4 and SL6 and the sensing input signal line SL5 disposed between the sensing input signal lines SL4 and SL6 to have a high touch possibility. The operator 210 controls the sensing input voltages of the sensing output signal lines SL4, SL5, and SL6 to be amplified to voltage $V_4$. The operator 210 determines the touch sensors TSU connected to the sensing input signal lines SL1, SL2, SL3, and SL7 to have a low touch possibility. The operator 210 controls the sensing input voltages of the sensing input signal lines SL1, SL2, SL3, and SL7 to be reduced to voltage $V_1$.

Figure 9:
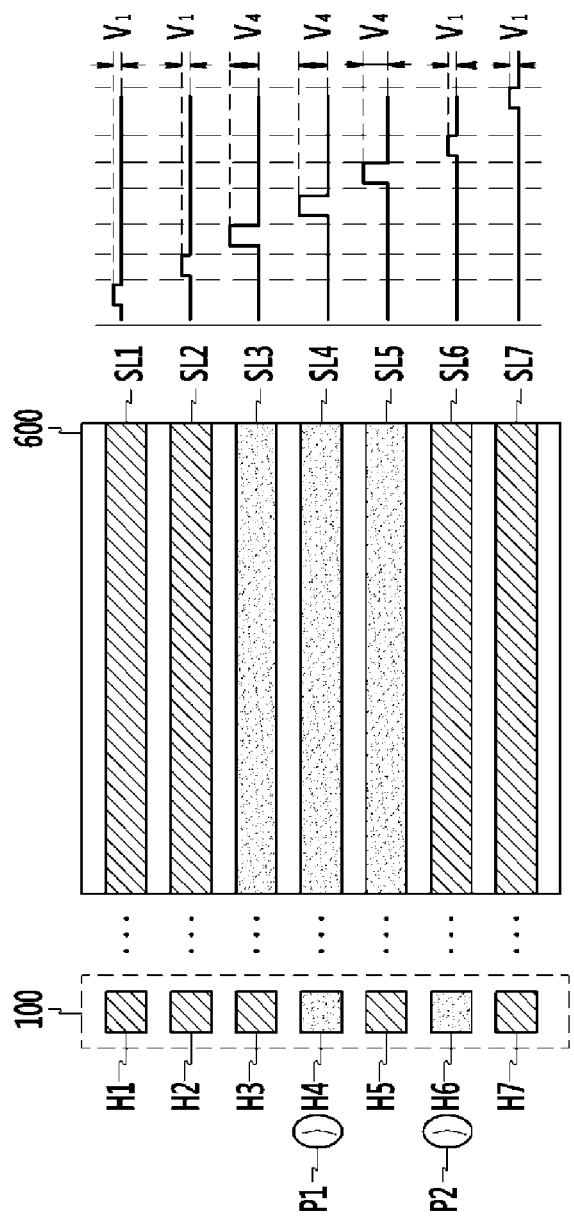
FIG. 9 and FIG. 10 illustrate a custom sensing input signal according to users.
Figure 10:
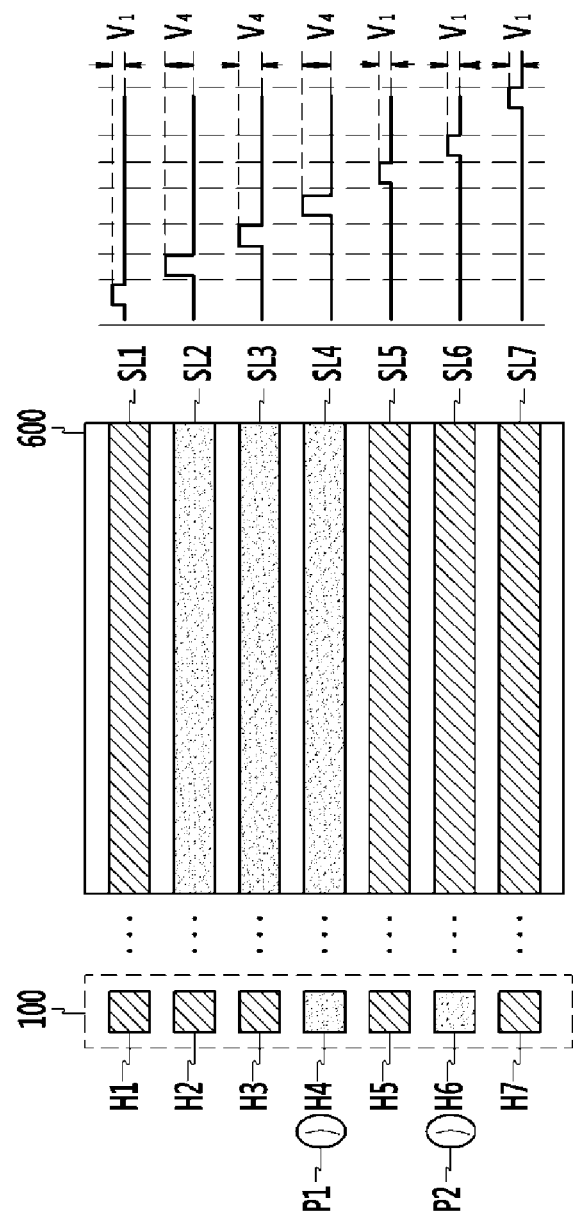

FIG. 9 and FIG. 10 illustrate a custom sensing input signal according to users.

The operator 210 may control the sensing input signals by determining the sensing input signal lines that are amplified per user, based on the recognized user statistics ST in addition to the sensing input signal lines corresponding to the touched gripping sensors.

Hereinafter, a method for controlling a custom sensing input signal per user will be described with reference to FIG. 9 and FIG. 10.

As shown in FIG. 9, the operator 210 recognizes positions of the sensing input signal lines SL4 and SL6 corresponding to the gripping sensors H4 and H6 based on the gripping signals HP generated as the gripping sensors H4 and H6 are touched by the fingers P1 and P2. The operator 210 determines the touch sensors TSU connected to the sensing input signal lines SL3 and SL4 to have a high touch possibility based on first user statistics ST.

Specifically, when the gripping sensors H4 and H6 are touched by the fingers P1 and P2 of the first user, the first user statistics ST indicate whether the number of times at which the touch sensors TSU connected to the sensing input signal lines SL3, SL4, and SL5 are touched by the first user is greater than a predetermined reference value, and the number of times at which the touch sensor TSU connected to the sensing output signal line SL6 are touched by the first user is smaller than the predetermined reference value. Accordingly, the operator 210 determines the touch sensors TSU connected to the sensing input signal lines SL3, SL4, and SL5 to have a high touch possibility when the first user touches the gripping sensors H4 and H6. The operator 210 controls the sensing input voltages of the sensing input signal lines SL3, SL4, and SL5 to be amplified to voltage $V_4$. The operator 210 determines the touch sensors TSU connected to the sensing input signal lines SL1, SL2, SL6, and SL7 to have a low touch possibility. The operator 210 controls the sensing input voltages of the sensing input signal lines SL1, SL2, SL6, and SL7 to be reduced to voltage $V_1$.

As shown in FIG. 10, the operator 210 detects positions of the sensing input signal lines SL4 and SL6 corresponding to the gripping sensors H4 and H6 based on the gripping signals HP generated as the gripping sensors H4 and H6 are touched by the fingers P1 and P2 of a second user. The operator 210 determines the touch sensors TSU connected to the sensing input signal line SL2, SL3, and SL4 to have a high touch possibility based on second user statistics ST.

Specifically, when the gripping sensors H4 and H6 are touched by the fingers P1 and P2 of the second user, the second user statistics ST indicate whether the number of times at which the touch sensors TSU connected to the sensing input signal lines SL2 to SL4 are touched by the second user is greater than the number of times at which the touch sensors TSU connected to the sensing output signal lines SL4 to SL6 are touched. Accordingly, the operator 210 determines the touch sensors TSU connected to the sensing input signal lines SL2 to SL4 to have a high touch possibility when the second user touches the gripping sensors H4 and H6. The operator 210 controls the sensing input voltages of the sensing input signal lines SL2 to SL4 to be amplified to voltage $V_4$. The operator 210 determines the touch sensors TSU connected to the sensing input signal lines SL1 and SL5 to SL7 to have a low touch possibility. The operator 210 controls the sensing input voltages of the sensing input signal lines SL1 and SL5 to SL7 to be reduced to voltage $V_1$.

Accordingly, the operator 210 may control custom sensing input voltages of the first user and the second user based on the statistics ST of each of the first and second users in response to the gripping signals HP.

Figure 11:
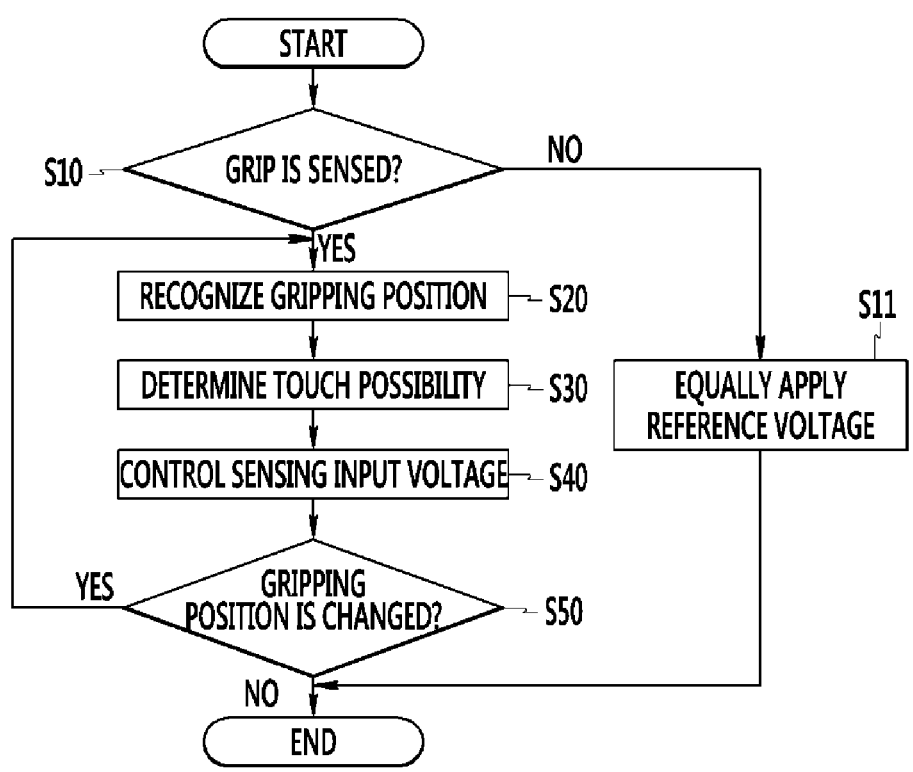
FIG. 11 is a flowchart illustrating a driving method of a display device according to an exemplary embodiment of the present invention.

FIG. 11 is a flowchart illustrating a driving method of a display device according to an exemplary embodiment the present invention.

In step S10, the signal controller 200 determines whether a grip is sensed by using the gripping signal HP.

In step S11, when a grip is not sensed, the signal controller 200 controls the sensing input signal to a predetermined reference voltage, and applies the predetermined reference voltage to all sensing input signal lines SL1-SLp.

In step S20, when a grip is sensed, the signal controller 200 detects a first position of the sensing input signal line corresponding to the touched gripping sensor.

In step S30, the signal controller 200 determines a touch sensor TSU to have a high touch possibility based on the gripping signal HP. In this case, the signal controller 200 may determine the touch sensor TSU to have the high touch possibility per user based on the statistics ST.

In step S40, the signal controller 200 controls the sensing input voltage by amplifying the sensing input voltage higher than the predetermined reference voltage for the sensing input signal line that is determined to have the high touch possibility, and by reducing the sensing input voltage lower than the predetermined reference voltage for the sensing input signal line that is determined to have a low touch possibility.

In step S50, the signal controller 200 detects a second position of the sensing input signal line corresponding to the touched gripping sensor based on the gripping signal HP, and returns to the step S20 to detect a position of a new sensing input signal line, if this second position is different from the first position recognized in step S20.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A display device, comprising:
 a display;
 a plurality of gripping sensors formed at edges of the display and configured to generate a gripping signal according to a gripping of an edge of the display;
 a sensing scan driver configured to generate sensing input signals according to a gripping position based on the gripping signal; and
 a plurality of touch sensors formed on the display and configured to generate a sensing output signal in response to a touch of the display based on the sensing input signals, wherein:
 the sensing input signals include a first sensing input signal and a second sensing input signal;
 the first sensing input signal corresponds to a touched gripping sensor;
 the second sensing input signal corresponds to a non-touched gripping sensor; and
 the first sensing input signal has a higher voltage than the second sensing input signal.
2. The display device of claim 1, wherein:
 the first sensing input signal has a higher voltage than a predetermined reference voltage; and the second sensing input signal has a lower voltage than the predetermined reference voltage.

3. The display device of claim 2, wherein:
the gripping sensors comprise a first gripping sensor, a second gripping sensor, and a third gripping sensor;
the second gripping sensor corresponds to the touched gripping sensor;
the first gripping sensor and the third gripping sensor correspond to the non-touched gripping sensor; and
the second gripping sensor is formed between the first gripping sensor and the third gripping sensor.

4. The display device of claim 3, wherein the gripping sensors are formed at a left side of the display, at a right side of the display, or at the left side and the right side of the display.

5. The display device of claim 4, wherein the sensing scan driver is configured to generate statistics based on a gripping signal and an accumulated sensing output signal of a user.

6. The display device of claim 5, wherein:
the generated statistics include a number of touch times the touch sensors are accumulatively touched; and
the sensing scan driver is configured to generate the first sensing input signal corresponding to the number of touch times a corresponding touch sensor is accumulatively touched that is equal to or greater than a reference touch number.

7. The display device of claim 6, wherein the sensing scan driver is configured to generate the second sensing input signal corresponding to a number of touch times a corresponding touch sensor is accumulatively touched that is equal to or lower than the reference touch number.

8. The display device of claim 7, wherein the sensing scan driver is configured to generate the first sensing input signal according to Gaussian distribution that has the first sensing input signal as a maximum value.

9. The display device of claim 7, wherein the sensing scan driver is configured to generate the first sensing input signal according to inverse Gaussian distribution that has the first sensing input signal as a minimum value.

10. A sensor device included in a display, comprising:
a first sensor group formed at edges of the display and configured to generate first signals according to a touch of the first sensor group; and
a second sensor group formed on the display and configured to generate output signals in response to a touch of the second sensor group based on input signals, wherein:
voltage input signals are proportional to whether the first sensor group is touched;
the input signals include a first input signal and a second input signal;
the first input signal corresponds to a touched sensor;
the second input signal corresponds to a non-touched sensor; and
the first input signal has a higher voltage than the second input signal.

11. The sensor device of claim 10, wherein:
the first input signal has a higher voltage than a predetermined reference voltage; and
the second input signal has a lower voltage than the predetermined reference voltage.

12. The sensor device of claim 11, wherein:
the first sensor group comprises a first touch sensor, a second touch sensor, and a third touch sensor;
the second touch sensor corresponds to the touched sensor;
the first touch sensor and the third touch sensor correspond to the non-touched sensor; and
the second touch sensor is formed between the first touch sensor and the third touch sensor.

13. The sensor device of claim 12, wherein the first sensor group is formed at a left side of the display, at a right side of the display, or at the left side and the right side of the display.

14. The sensor device of claim 13, wherein the first input signal has a higher voltage than the predetermined reference voltage when the number of the second touch sensor accumulatively touched is equal to or greater than a reference touch number.

15. The sensor device of claim 14, wherein the second input signal has a lower voltage than the predetermined reference voltage when the number of the first touch sensor accumulatively touched is equal to or lower than the reference touch number, or when the number of the third touch sensor accumulatively touched is equal to or lower than the reference touch number.

16. The sensor device of claim 15, wherein the first input signal is generated as a maximum value according to Gaussian distribution.

17. The sensor device of claim 15, wherein the first input signal is generated as a minimum value according to Gaussian distribution.

* * * * *